May 10, 1966     G. VASU ETAL     3,250,903
AMPLITUDE RATIO COMPUTER AND CONTROL SYSTEM
Filed Sept. 27, 1961                                           3 Sheets-Sheet 1

INVENTORS
GEORGE VASU
BY KIRBY W. HILLER
ATTORNEYS

May 10, 1966 G. VASU ETAL 3,250,903
AMPLITUDE RATIO COMPUTER AND CONTROL SYSTEM
Filed Sept. 27, 1961 3 Sheets-Sheet 2

INVENTORS
GEORGE VASU
KIRBY W. HILLER

BY
J. O. Tresansky
ATTORNEYS

United States Patent Office 3,250,903
Patented May 10, 1966

3,250,903
AMPLITUDE RATIO COMPUTER AND
CONTROL SYSTEM
George Vasu, 37825 Lorie Blvd., Avon, Ohio, and Kirby
W. Hiller, 494 Woodmere Road, Berea, Ohio
Filed Sept. 27, 1961, Ser. No. 141,221
15 Claims. (Cl. 235—186)

The invention described herein may be manufactured and used by or for the Government of the United States of America for governmental purposes without the payment of any royalties thereon or therefor.

This invention relates to self-adaptive control systems and concerns particularly employment of amplitude ratio computation for correction of system operation.

An object of the invention is to obtain automatic control of significant dynamic performance criteria such as open-loop gain, open-loop phase shift, closed-loop gain, closed-loop phase shift, gain margin and phase margin, or a combination of two or more criteria such as amplitude ratio and phase shift comparison or gain and phase margin control.

A further object of the invention is to provide amplitude ratio computers of general application.

A further object is to provide improved instruments and methods of measurement of gain for general system studies.

A further object is to provide signals suitable for direct recording of measured quantities.

Still another object of the invention is to provide a control system capable of performing over a wide range of conditions. A specific object of the invention is to avoid erratic operation and instabilities.

Still another object of the invention is to render a control system independent of variations in characteristics of components as the system performs throughout its operating regime. More specifically, an object of the invention is to render a control system independent of operating point changes due to wear, aging, damage or other causes, whether the variations are predictable or not.

A further object of the invention is to avoid the necessity of adjustments in controls to compensate for variations, to avoid the necessity for previous calibrations of the system and to avoid the necessity for scheduling adjustments in accordance with a parameter related to the variations.

A further object of the invention is to monitor significant dynamic performance parameters during actual operation of a component or several components of the system, whether it be open-loop, closed-loop, single- or multiple-loop systems.

A more specific object of the invention is to provide self-adaptive systems which will automatically compute significant dynamic performance parameters such as amplitude-ratio, gain and phase shift.

Other and further objects, features and advantages of the invention will become apparent as the description proceeds.

In carrying out the invention in accordance with a preferred form thereof, a control system is rendered self-adaptive by providing it with means for automatically computing significant dynamic performance parameters such as gain and phase shift, and the present invention concerns particularly the amplitude ratio computation. These computed parameters are compared with appropriate references, thereby generating error signals. The error signals are then utilized to control dynamic performance by automatically maintaining selected values of pertinent dynamic performance criteria such as open-loop gain, open-loop phase shift, closed-loop gain, closed-loop phase shift, gain margin, or phase margin.

The heart of these self-adaptive control systems comprises subsystems that automatically compute gain, amplitude ratio, or phase shift of a selected portion of the system. Multiplier-type systems provide a computation of both gain and phase shift. The present invention relates particularly to certain kinds of multiplier-type systems which are designed to operate best from a single frequency function as an operating signal and are therefore designated as multiplier-type "amplitude-ratio" computers to distinguish them from systems that are not designed specifically for a single frequency operating signal.

A better understanding of the invention will be afforded by the followling detailed description considered in conjunction with the accompanying drawings, in which:

FIG. 1 constitutes a block diagram of a multiplier-type amplitude-ratio computer.

In accordance with the invention, system output and input signals are multiplied. A measure of the gain of the system in terms of amplitude ratio of output to input is obtained without computing a ratio of output signal to input signal. For computing amplitude-ratio, a sinusoidal forcing function is employed and sinusoidal form is preferable in order to maintain accuracy of the computation for all conditions.

Figure 1:
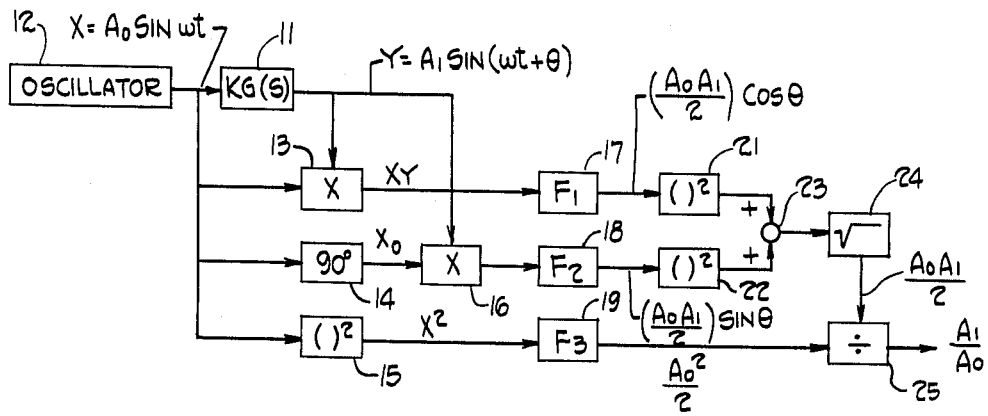

FIG. 1 of the drawing illustrates a computer for measuring amplitude ratio continuously and automatically. It is assumed that the measurement of amplitude ratio is desired for a system 11, the transfer function of which is $KG(s)$, where K represents gain for a given point on the operating curve of the system and $G(s)$ represents the dynamic function of a general system component or group of components, $s$ being the Laplacian operator. The computer is adapted for the general condition where both input signal amplitude and system phase shift are variable.

Signals suitable for automatic and continuous computation of amplitude ratio are obtained by utilizing a test signal $x$ generated by an oscillator 12, unless a suitable signal is already present in the system. The test signal assumed sinusoidal with variable amplitude $A_0$ may be represented by the equation:

$$x = A_0 \sin wt$$

The test signal $x$ disturbs the system, generating an output $y$. For simplicity in analysis, it will be assumed that the perturbations are small and that there are no abrupt non-linearities. The output can therefore be approximated by a sine wave designated as:

$$y = A_1 \sin (wt + \theta)$$

where $A_1$ is a factor representing peak amplitude
$w$ is $2\pi$ times the frequency or angular velocity in radians per second
$t$ is time, and
$\theta$ is the phase shift in radians As illustrated in the drawing, the computer comprises a multiplying circuit 13, responsive to signals $x$ and $y$, a 90-degree phase shifter 14 responsive to signal $x$, a squaring circuit 15 responsive to signal $x$, a multiplying circuit 16 responsive to the output of the phase shifter 14 and to the signal $y$, filters 17, 18 and 19, connected to the output terminals of elements 13, 16 and 15, respectively, squaring circuits 21 and 22, connected to the output terminals of filters 17 and 18, respectively, an adding circuit 23 responsive to the outputs of squaring circuits 21 and 22, a square root circuit 24 connected to the output terminal of the adding circuit 23, and a dividing circuit 25 responsive to the outputs of square root circuit 24 and filter 19. The multiplying, phase shifting, squaring, dividing and square root circuits are conventional circuits or function generators and do not constitute a part of the present invention and therefore need not be described in detail. An example of a multiplying circuit, however, is described in Patent No. 2,497,883 to Harris. The filters 17, 18 and 19 may be conventional filters of the low pass type, in the particular embodiment illustrated being designed to pass the D.-C. components $(A_0 A_1/2) \cos \theta$, $(A_0 A_1/2) \sin \theta$, and $A_0^2/2$, respectively. The term "circuit" is used generically, however, to include mechanical, hydraulic, pneumatic or other systems or combinations of them as well as electrical and electronic circuits and devices for performing the mathematical operations involved. Moreover, the operations may be performed either continuously or intermittently in either analog or digital devices.

The output $y$ is multiplied by the input $x$, giving $$xy = (A_0 \sin wt)[A_1 \sin (wt + \theta)]$$

$$= \frac{A_0 A_1}{2}[\cos (-\theta) - \cos (2wt + \theta)]$$

The signal $xy$ is thus composed of a steady component $(A_0 A_1/2) \cos (-\theta)$ and an oscillatory component $[(A_0 A_1/2) \cos (2wt + \theta)]$. Filter 17 removes the oscillatory component, leaving at the output of the filter 17 the steady component $[(A_0 A_1/2) \cos (-\theta)]$. Squaring then produces $[(A_0 A_1/2) \cos \theta]^2$.

In a similar manner, $y$ is multiplied by $x_0$, which is obtained by shifting the original signal $x$ by 90-degrees. This gives $$x_0 y = (A_0 \cos wt)[A_1 \sin (wt + \theta)]$$

$$= \frac{A_0 A_1}{2}[\sin \theta + \sin (2wt + \theta)]$$

The filter 18 removes the periodic term $$A_0 A_1/2 \sin (2 wt + \theta)$$

leaving as its output $(A_0 A_1/2) \sin \theta$, which is then squared to give $[(A_0 A_1/2) \sin \theta]^2$.

The two squared quantities are next summed to produce $$\left(\frac{A_0 A_1}{2}\right)^2 (\cos^2 \theta + \sin^2 \theta) = \left(\frac{A_0 A_1}{2}\right)^2$$

Taking the square root leaves $A_0 A_1/2$.

Starting with $x$ again and squaring it results in $$x^2 = A_0^2 \sin^2 wt$$

$$= \frac{A_0^2}{2}(1 - \cos 2wt)$$

Filtering in the filter 19 leaves $A_0^2/2$, and dividing this into $A_0 A_1/2$ produces the desired ratio $A_1/A_0$.

Thus, the system described gives continuous indication of the amplitude ratio $A_1/A_0$ for the given frequency, regardless of the amplitude of the signal $x$ and of the phase shift $\theta$. Zero values of $\sin \theta$ and $\cos \theta$ create no problems. Satisfactory performance depends upon the cyclic nature and phase relation of $\sin \theta$ and $\cos \theta$.

Figure 5:
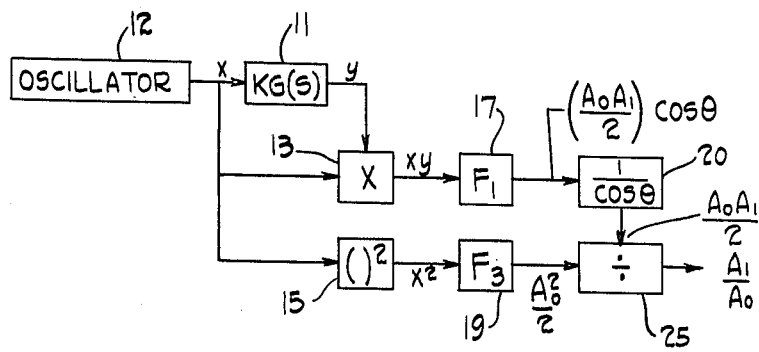
FIG. 5 is a block diagram of a simplification of the computer of FIG. 1 for use where phase shift remains relatively constant.

If the input amplitude $A_0$ is variable but the phase shift $\theta$ is constant for the particular frequency chosen, then a portion of the computer shown in the drawing can be omitted as illustrated in FIG. 5. Since $\cos \theta$ is now a constant, it can be removed from the output of the filter 17 by utilizing a simple gain component 20, the gain of which equals $1/\cos \theta$. Gain component 20 thus compensates for the attenuation due to phase shift produced by the system. In this case the quadrature phase shifter unit 14 and units 16, 18 and 22 and the adding circuit 23 can be omitted as well as the squaring unit 21 with the output of the filter 17 passing directly to a $1/\cos \theta$ gain component 20 replacing the square root unit 24. The output of the $1/\cos \theta$ gain component 20 then equals $A_0 A_1/2$. Dividing this by the output of the filter 19, $A_0^2/2$, produces the desired ratio signal of amplitude ratio $A_1/A_0$.

This method of computing amplitude ratio can be used to obtain an indication of the gain of system in which the gain is varying but the dynamics are not. It can also be used in a situation where the predominant variation is produced by amplitude variation and a minor or insignificant effect is produced by phase shift variation; that is, the relative sensitivity of the output $A_1/A_0$ to amplitude ratio and phase shift variations must be considered. In certain ranges, $\cos \theta$ can remain relatively constant while $\theta$ is varying. As a result, such a system can be used to obtain an indication of amplitude ratio when the phase shift is varying if the range of phase shift variation happen to be in specific regions such as 0°, 180°, 360°, and so forth.

Figure 6:
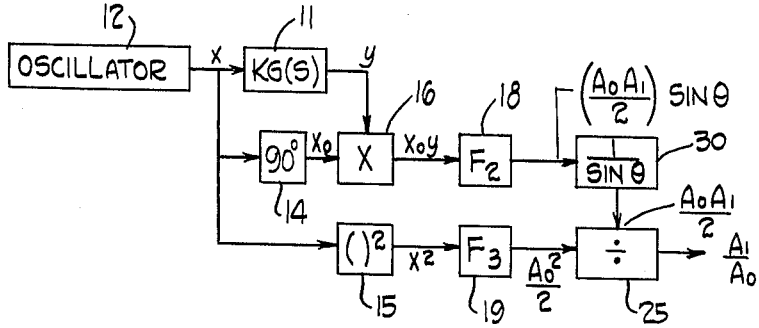
FIG. 6 is a block diagram of an alternate simplification of the computer of FIG. 1 for use where the phase shift remains relatively constant.

Alternatively, instead of omitting the units 14, 16, 18, 21, 22 and 23 in cases where the phase shift $\theta$ is constant or varies a limited amount in specific ranges of operation, the units 13, 17, 21 and 22 with 23 may be omitted, as shown in FIG. 6. Such a system would utilize the phase shifted signal $x_0$ instead of $x$ directly. The output of the filter 18 is thus $(A_1 A_0/2) \sin \theta$. The $\sin \theta$ portion of this signal can be removed by a gain component 30, the gain of which is $1/\sin \theta$ replacing the square root unit 24 and an output $A_1 A_0$ is produced in the same manner as previously discussed.

Although the latter arrangement is more complicated in retaining the 90-degree phase shift unit 14, it may be preferable for a range of operation of the system where the frequency is such that $\cos \theta$ is near zero. Alternatively, one of the signals $x$ or $y$ would require a shift of phase angle (not necessarily 90°) in the $\cos \theta$ system of FIG. 5.

Figure 7:
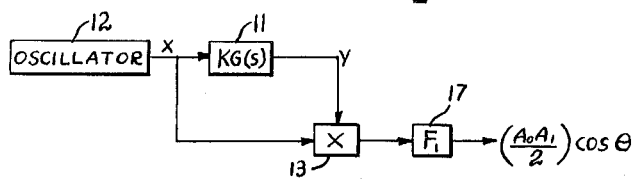
FIG. 7 is a block diagram of an alternate simplification of the computer of FIG. 1 for use where both input amplitude and phase shift remains constant.

If the input amplitude $A_0$ and the phase shift $\theta$ both remain constant, the system may be simplified even further by omission of the units 14, 16, 18, 22, 23, 24, 25 and 15 and 19 as well as 21 as seen in FIG. 7, taking the output directly from the filter 17 to obtain a value of $(A_0 A_1/2) \cos \theta$ which is proportional to $A_1/A_0$ for constant value of $A_0$ and $\theta$.

Figure 2:
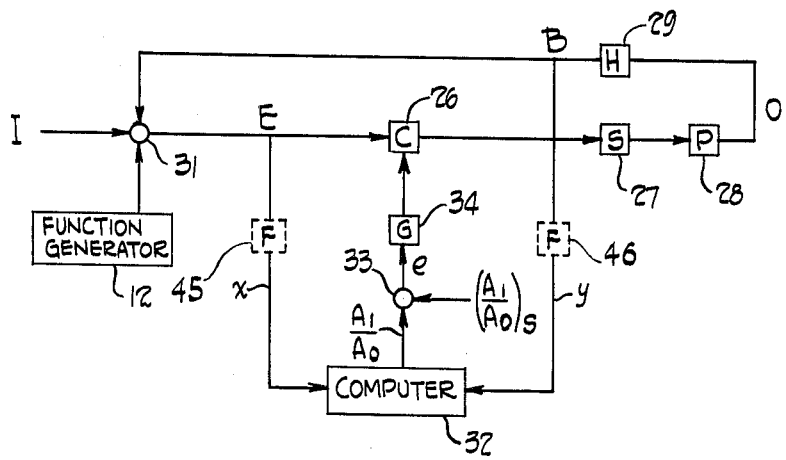
FIG. 2 is a block diagram of a closed-loop control system illustrating a manner of utilizing the computer of FIG. 1.

One general arrangement of a system for providing automatic control of amplitude ratio, phase shift or the like is represented in FIG. 2. The system for control of amplitude ratio utilizing the computer of FIG. 1 is specifically illustrated in FIG. 2. FIG. 2 represents a single closed-loop system consisting of a main controller 26, a servo 27 and the plant to be operated 28 with a feedback device 29 from the output of the plant 28. An adder 31 receives the input signal I together with the feedback signal from the feedback unit 29 and the output of the oscillator or a function generator 12.

In order to control the amplitude ratio, the error signal E corresponding to $x$ and the feedback signal B corresponding to $y$ are sensed by the computer 32. The latter computes the amplitude ratio from E to B by selecting with tuned filters 45 and 46 the frequency component desired for amplitude ratio computation and then performing the operations indicated, as hereinbefore mentioned, with regard to FIG. 1 to obtain $A_1/A_0$ for the selected frequencies. In general, signals E and B will contain many frequency components and, therefore, tuned filters 45 and 46 are desired to select the frequency component for which the amplitude ratio computer was designed. However, a system design might be considered wherein the function generator 12 generates a strong single frequency signal such that the signals at E and B are predominately of a single frequency component, thereby enabling elimination of the tuned filters 45 and 46. The measured or computed amplitude ratio is compared with a desired set value $(A_1/A_0)_s$ by a comparator 33 which produces an error signal $e$. This error $e$ then actuates a gain controller 34 which varies the main controller 26, causing an increase or decrease in the gain within the main controller 26 as required to satisfy the error signal.

Figure 3:
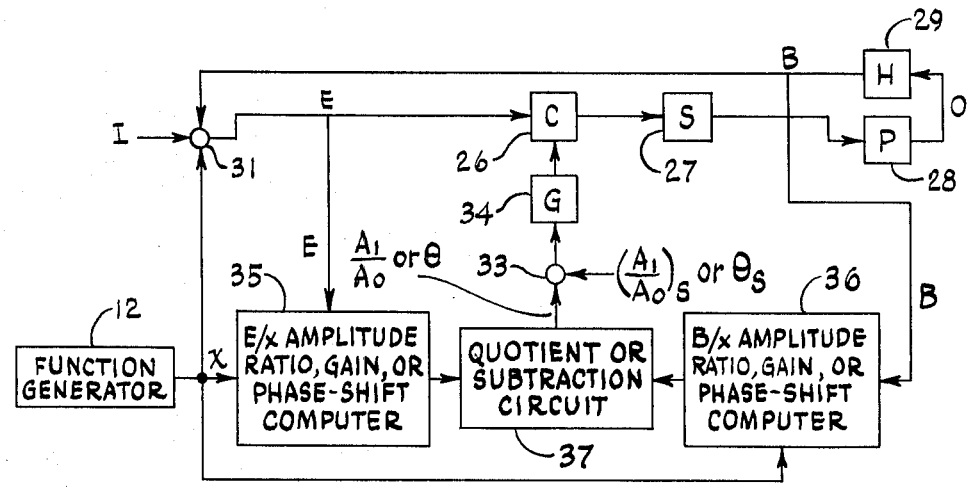
FIG. 3 is a block diagram of a control system employing multiple computers.

For applications in which a specified input to the gain or phase shift computer is desired, alternative systems may be employed. An example of such a system is illustrated in FIG. 3. The system of FIG. 3 employs multiple gain, amplitude ratio or phase-shift computers.

A function generator 12 again produces a signal $x$ that is injected into the main loop and into two computers 35 and 36. The computers 35 and 36 are either gain, amplitude ratio or phase shift computers according to the condition which is to be maintained in the system. If amplitude ratio between points B and E is to be maintained, the computers 35 and 36 may be of the type illustrated in FIG. 1. The computer 35 provides a measure of the gain or phase shift from $x$ to a point in the main loop such as E. The computer 36 provides a measure of the gain or phase shift from $x$ to some other desired point in the loop such as B. A third computer 37 is provided which may be a simple quotient circuit in the case of amplitude ratio or gain computation, or a simple subtraction circuit in case of phase shift computation in computers 35 and 36. Accordingly, the third computer 37 generates the gain or phase shift between the two selected points in the main loop E and B. The comparator compares the measured value with the set value of $A_0/A_1$ where 35 and 36 are amplitude ratio computers.

Figure 4:
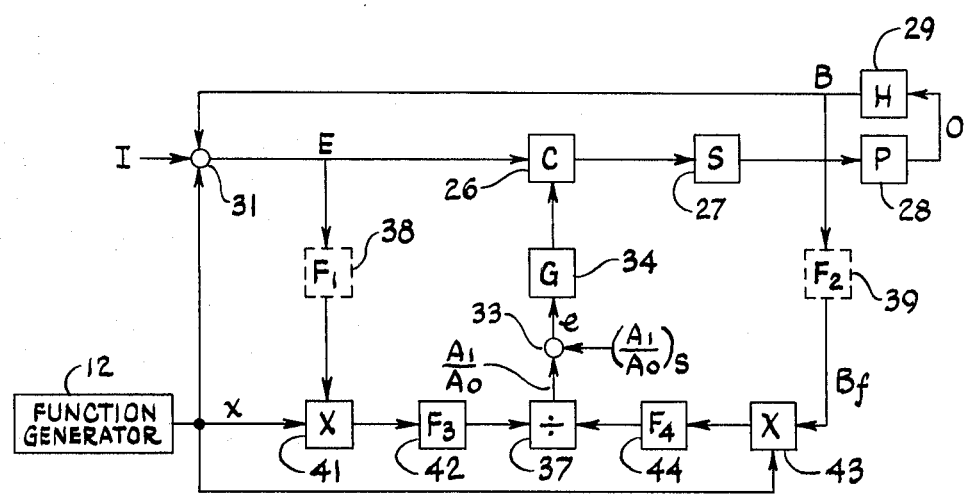
FIG. 4 is a block diagram of a simplification of the system of FIG. 3 employing simplified computers.

To illustrate a simplified system with simplified computers, FIG. 4 may be considered. It is assumed that it is desired to control loop gain of the system by sensing amplitude ratio of $B/E$. FIG. 4 illustrates such an arrangement using two simplified multiplier-type gain computers, which are in this case amplitude ratio computers. The function generator 12 can generate a single frequency for which filters 38 and 39 are tuned and may be inserted to select mainly the frequency generated by the function generator 12.

The computer 35 of FIG. 3 takes the simplified form in FIG. 4 of a multiplier 41 and low pass filter 42 corresponding to elements 13 and 17, respectively, of FIG. 1. The computer 36 of FIG. 3 likewise takes the form in FIG. 4 of a multiplier 43 and a low pass filter 44.

In self-adaptive control systems where some other type of compensation is desired, instead of amplitude ratio compensation, a different type of computer is substituted for the amplitude ratio computer such as a phase shift computer, gain margin computer or phase margin computer, for example. Examples are described in Conference Paper No. CP 60–1381, Self-Adaptive Systems for Automatic Control of Dynamic Performance by Controlling Gain, Phase Shift, Gain Margin, Phase Margin, Or Slope by George Vasu, presented at the 1960 Fall General Meeting of American Institute of Electrical Engineers, October 9–14, Chicago, Illinois, and published by the American Institute of Electrical Engineers. A suitable phase shift computer is described in our co-pending application, Serial No. 141,224 filed September 27, 1961.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended, therefore, to cover all such modifications and variations as fall within the scope of the invention.

What is claimed is:

1. An amplitude ratio computer for a system having input and output connections, said computer comprising in combination means for supplying a selected signal to said input connections, first and second filters to pass selected D.-C. components, means for multiplying input and output signals of the system and applying them to the first filter, means for squaring the input signal and supplying it to the second filter, and means for dividing the output of the first filter by the output of the second filter to produce a signal proportional to amplitude ratio of the system output and input signals.

2. An amplitude ratio computer for a system having input and output connections, said computer comprising in combination means for supplying a selected signal to said input connections, first and second filters to pass selected D.-C. components, means for multiplying input and output signals of the system and applying them to the first filter with means for quadrature shifting of one of said signals before mixing, means for squaring the input signal and supplying it to the second filter and means for dividing the output of the second filter by the output of the first filter to produce a signal proportional to amplitude ratio of the system output and input signals.

3. An amplitude ratio computer for the input and output signals of a system, said computer comprising in combination means for supplying input signals of a selected frequency, means for multiplying input and output signals to form a mixed signal, and means for selecting low frequency components from the mixed signal to produce a signal proportional to amplitude ratio of output and input signals.

4. An amplitude ratio computer for the input and output signals of a system comprising in combination means for supplying signals of a selected frequency to the system, means for multiplying the input and output signals to form mixed signals, means for squaring the input signals to form squared signals, means for selecting components of the selected frequency from the mixed signals and the squared signals and dividing one by the other to produce a signal representing amplitude ratio of the output and input signals of the system.

5. A computer as in claim 4 including means for compensation for the attenuation due to phase shift produced by the system.

6. An amplitude ratio computer for a system having input and output connections, said computer comprising in combination a substantially sinusoidal oscillator with an output connection to the system input connection, first and second multipliers, each having input connections from the system input and output connections, a 90-degree phase shifter interposed in one of said multiplier input connections, a first squarer having an input connection from the system input connection, second and third squarers, and a divider, each having an input connection, said connections being from the first and second multipliers and the first squarer, respectively, low pass filters tuned for passing the D.-C. components of said multipliers and squarer interposed in said last mentioned input connections, an adder with input connections from the second and third squarers and an output connection, the divider having a second input connection and an output connection, and a square-root circuit with an input from the adder output and an output to the second divider input connection, whereby a signal appears in the divider output connection proportional to amplitude ratio of the system.

7. An amplitude ratio computer for a system having input and output connections, said computer comprising in combination means for supplying a selected frequency to said input connection, first and second and third filters to pass selected D.-C. components, means for multiplying input and output signals of the system and applying them to the first filter, means for multiplying input and output signals and applying them to the second filter with means for quadrature shifting one of said signals before multiplying, and means for squaring the input signal and supplying it to the third filter, means for squaring and adding the filtered output of the first and second filters, means for extracting the square-root of the sum produced by the adding means, and means for dividing the extracted square-root by the filtered output of the third filter to produce a signal proportional to amplitude ratio of the system output and input signals.

8. An automatic condition control arrangement for an amplitude ratio in a control system which is designed for maintenance of an amplitude ratio relationship between two points in the system, which points are referred to as feedback signal point and the error signal point, which comprises the combination of means for directing signals of a predetermined frequency to the error signal point, an adjustable controller beyond the error signal point and interposed in the system, having an input connection and responsive to input signal thereto for adjustment of the system amplitude ratio in response to variations in input signals to the adjustable controller, computer means responsive to amplitude ratio between the feedback point and the error point, said computer means having input connections from said points and an output connection, a comparator having an input connection from said computer means and a second input connection and an output connection, an amplitude ratio controller having an input connection connected to the comparator output connection and an output connection connected to the adjustable controller input connection, and means for supplying a set value of the amplitude ratio relationship to be maintained to said comparator second input connection.

9. Apparatus, as in claim 8, with filter means interposed between the feedback and error signal points and computer input connections for selecting the desired frequency component injected into the system by said signal directing means.

10. An automatic condition control arrangement for a condition in a control system which is designed for maintenance of a condition relationship between two points in the system, which points are referred to as the feedback signal point and the error signal point, which comprises the combination of means for directing signals of a predetermined frequency to the error signal point, an adjustable controller beyond the error signal point and interposed in the system, having an input connection and responsive to input signal thereto for adjustment of the system condition in response to variations in input signals to the adjustable controller, computer means responsive to relationships of the condition to be controlled between the feedback point and the error point, said computer means having input connections from said points and an output connection, a comparator having an input connection from said computer means and a second input connection with an output connection, means for supplying a set value of the condition relationship to be maintained to said second comparator input connection and a controller having an input connection connected to the comparator output connection and an output connection connected to the adjustable controller input connection.

11. Apparatus, as in claim 10, with filter means interposed between the feedback and error signal points and computer input connections for selecting the desired frequency component injected into the system by said signal directing means.

12. In a control system, means for maintaining a predetermined relation of signal amplitude between two points in the system referred to as the feedback and error points, respectively, an adjustable controller interposed in the system beyond the said error point having an input connection for adjusting the ratio of output to input amplitude of an injected signal, a pair of multipliers, means for injecting selected frequency components into the system and into said multipliers, said multipliers having input connections respectively from the error and feedback points of the system and each having an output connection, a divider having input connections from the output connections of the multipliers, low pass filters interposed in the input connections to the divider, said divider having an output connection, a comparator having an input connection from the divider output and an output connection, an amplitude ratio controller having an output connection connected to the adjustable controller input connection, said amplitude ratio controller having an input connection connected to the comparator output connection, and means for supplying a set value of amplitude ratio to the comparator for comparison with the divider output, said comparator having an error output, said error output being supplied to the input connection of the amplitude ratio controller.

13. Apparatus, as in claim 12, wherein filters are interposed in the connections from the error point of the system to the first multiplier and from the feedback point of the system to the second multiplier, respectively.

14. In a control system, means for maintaining a predetermined relation of signal amplitude between two points in the system referred to as the feedback and error points, respectively, an adjustable controller interposed in the system beyond the said error point having an input connection for adjusting the ratio of output to input amplitude of injected signals, a pair of amplitude ratio computers, said computers having input connections respectively from the error and feedback points of the system and each having an output connection, a divider having input connections from the output connections of said computers, means for directing selected frequency components into the system and into said computers, a comparator having an input connection from the divider output and having an output connection, an amplitude ratio controller having an output connection connected to the adjustable controller input connection, said amplitude ratio controller having an input connection connected to the comparator output connection, and means for supplying a set value of amplitude ratio to the comparator for comparison with the divider output, said comparator having an error output, said error output being supplied to the input connection of the amplitude ratio controller.

15. In a control system, means for maintaining a predetermined relation of signals between two points in the system referred to as the first point and second point respectively, an adjustable controller interposed in the system beyond the first point having an input connection for adjusting the relationship of signals at the second point to those at the first point, a pair of computer means, said computer means having input connections respectively from the first and second points of the system and each having an output connection, means having input connections from the output connections of said computer means for operating on the output of said computer means, means for directing selected frequency components into the system and into said computer means, a comparator having an input connection from the operator means output and an output connection, a relationship controller having an output connection connected to the adjustable controller input connection, said relationship controller having an input connection connected to the comparator output connection, and means for supplying a set value to the comparator for comparison with the operator means output, said comparator having an error output, said error output being supplied to the input connection of the relationship controller.

References Cited by the Examiner

UNITED STATES PATENTS

| | | | |
|---|---|---|---|
| 2,902,644 | 9/1959 | McDonald | 324—77 X |
| 2,907,950 | 10/1959 | Raisbeck | 324—57 |
| 2,932,471 | 4/1960 | Exner et al. | 235—151 X |
| 3,013,721 | 12/1961 | Foster et al. | 235—151 |

OTHER REFERENCES

Pages 16 to 20, May 1958—Chelustkin, "The Design and Application of Correlation Control," Automatic Control.

MALCOLM A. MORRISON, *Primary Examiner.*

DARYL W. COOK, *Examiner.*